United States Patent
Daniyalzade et al.

(10) Patent No.: US 10,762,765 B1
(45) Date of Patent: Sep. 1, 2020

(54) SYSTEM AND METHOD FOR RECORD MANAGEMENT

(71) Applicant: Walmart Apollo, LLC, Bentonville, AR (US)

(72) Inventors: Eytan Daniyalzade, San Francisco, CA (US); Berk Atikoglu, San Francisco, CA (US); David Nelms, Rogers, AR (US)

(73) Assignee: WALMART APOLLO, LLC, Bentonville, AR (US)

( * ) Notice: Subject to any disclaimer, the term of this patent is extended or adjusted under 35 U.S.C. 154(b) by 0 days.

(21) Appl. No.: 16/261,257

(22) Filed: Jan. 29, 2019

Related U.S. Application Data

(60) Provisional application No. 62/623,464, filed on Jan. 29, 2018, provisional application No. 62/623,474, filed on Jan. 29, 2018.

(51) Int. Cl.
G08B 21/00 (2006.01)
G08B 21/24 (2006.01)
(Continued)

(52) U.S. Cl.
CPC ....... *G08B 21/24* (2013.01); *G06F 16/24575* (2019.01); *G06F 16/29* (2019.01);
(Continued)

(58) Field of Classification Search
CPC .............. G08B 21/24; G06K 7/10366; G06K 7/10297; G06K 7/1413; G06K 19/0723; G06F 16/24575; G06F 16/29
(Continued)

(56) References Cited

U.S. PATENT DOCUMENTS 6,522,772 B1   2/2003 Morrison et al.
8,880,434 B2   11/2014 Bemmel et al.
(Continued)

*Primary Examiner* — Tanmay K Shah
(74) *Attorney, Agent, or Firm* — Bryan Cave Leighton Paisner LLP

(57) ABSTRACT

Various embodiments include a system that can comprise one or more processing modules and/or one or more non-transitory memory storage modules storing computing instructions on the one or more processing modules. The computing instructions can be configured to perform the acts of accessing a user history of a user in a first database, wherein the user history can comprise a first set of records describing a first set of physical items, wherein the first set of records can comprise a first distinct record describing a first distinct physical item, and/or wherein the first set of physical items can comprise the first distinct physical item; querying a physical item database for a second distinct record, wherein the physical item database can comprise the second distinct record, and wherein the second distinct record can describe a location of the first distinct physical item; receiving a first physical proximity indication that the user is within a first predefined physical proximity to the location of the first distinct physical item; in response to receiving the first physical proximity notification, automatically notifying the user that the user is within the first predefined physical proximity to the location of the first distinct physical item; receiving a first removal indication that the user has removed the first distinct physical item from the location of the first distinct physical item; and/or in response to receiving the first removal indication, automatically removing the first distinct record from the user history. Other embodiments are also disclosed herein.

20 Claims, 9 Drawing Sheets

(51) Int. Cl.
  *G06F 16/2457* (2019.01)
  *G06F 16/29* (2019.01)
  *G06K 7/10* (2006.01)
  *G06K 19/07* (2006.01)
  *G06K 7/14* (2006.01)

(52) U.S. Cl.
  CPC ..... *G06K 7/10297* (2013.01); *G06K 7/10366* (2013.01); *G06K 7/1413* (2013.01); *G06K 19/0723* (2013.01)

(58) Field of Classification Search
  USPC ...................................................... 340/686.6
  See application file for complete search history.

(56) References Cited

U.S. PATENT DOCUMENTS

| | | | |
|---|---|---|---|
| 9,665,896 B2 | 5/2017 | Atikoglu et al. | |
| 2003/0018522 A1 | 1/2003 | Denimarck et al. | |
| 2004/0133477 A1 | 7/2004 | Morris et al. | |
| 2007/0129056 A1 | 6/2007 | Cheng et al. | |
| 2008/0046366 A1 | 2/2008 | Bemmel et al. | |
| 2009/0152343 A1 | 6/2009 | Carter et al. | |
| 2012/0259732 A1* | 10/2012 | Sasankan | G01S 5/0205 |
| | | | 705/26.9 |
| 2013/0112746 A1 | 5/2013 | Krell | |
| 2014/0244514 A1 | 8/2014 | Rodriguez et al. | |
| 2017/0270559 A1* | 9/2017 | Zimmerman | G06Q 30/0222 |

* cited by examiner

SYSTEM AND METHOD FOR RECORD MANAGEMENT

CROSS-REFERENCE TO RELATED APPLICATIONS

This application claims the benefit of Provisional Patent Application No. 62/623,464, filed Jan. 29, 2018, which is herein incorporated by reference in its entirety. This application also claims the benefit of Provisional Patent Application No. 62/623,474, filed Jan. 29, 2018, which is herein incorporated by reference in its entirety.

TECHNICAL FIELD

This disclosure relates generally to database and file management, and relates more particularly to reminding users about a previously viewed or selected record.

BACKGROUND

The overwhelming amount of information on computer systems has resulted in users of computer systems often using the computer system to create a list of records to refer to later and then forgetting about the list. Some users also can either purposefully or mistakenly delete the list, only to realize later that they needed the list of records. This issue becomes especially pertinent when records on computer systems describe real-world objects that the user needs to take into their possession. Thus, it is beneficial for a system to reminds a user of his list of records when he is near an item in the real world that was on his list.

BRIEF DESCRIPTION OF THE DRAWINGS

To facilitate further description of the embodiments, the following drawings are provided in which.

Figure 1:
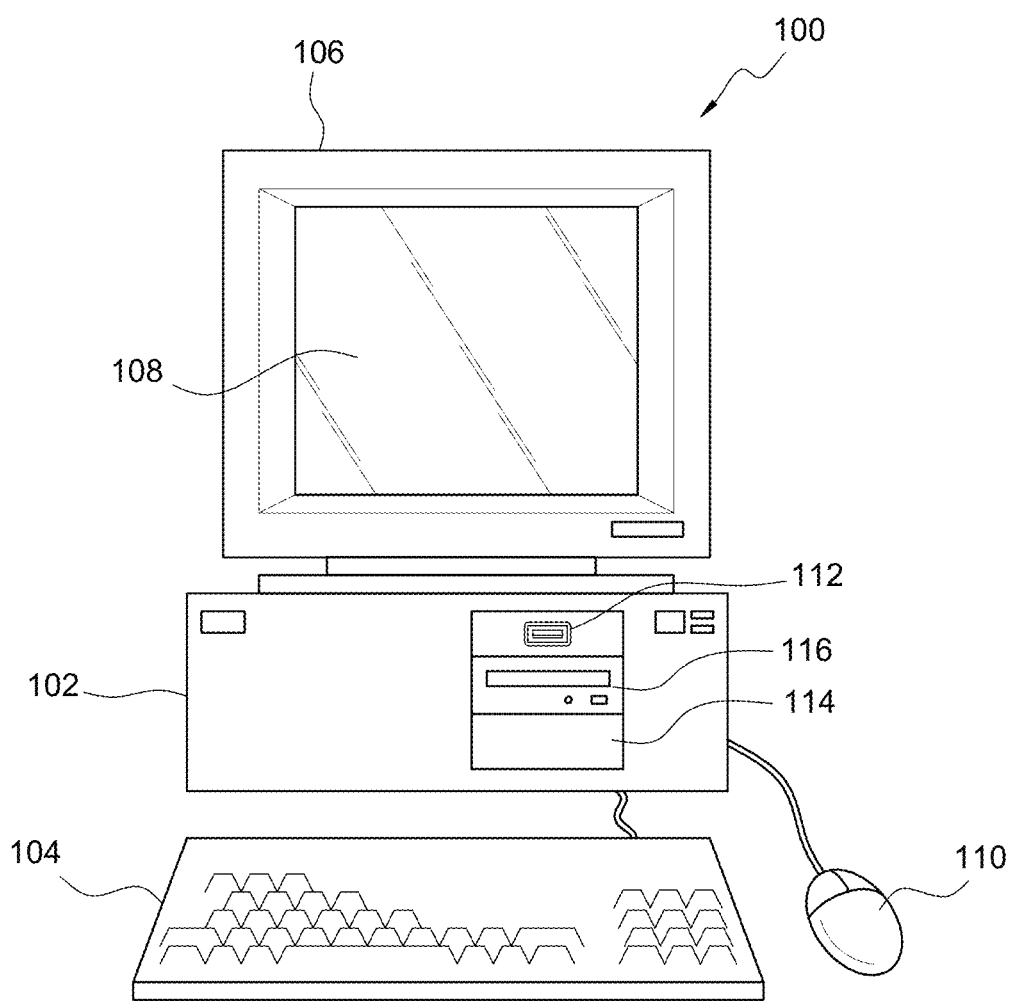
FIG. 1 illustrates a front elevation view of a computer system that is suitable for implementing an embodiment of the system disclosed in FIG. 3.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

Various embodiments can include a system that can comprise one or more processing modules and/or one or more non-transitory memory storage modules storing computing instructions on the one or more processing modules. The computing instructions can be configured to perform the acts of accessing a user history of a user in a first database, wherein the user history can comprise a first set of records describing a first set of physical items, wherein the first set of records can comprise a first distinct record describing a first distinct physical item, and/or wherein the first set of physical items can comprise the first distinct physical item; querying a physical item database for a second distinct record, wherein the physical item database can comprise the second distinct record, and wherein the second distinct record can describe a location of the first distinct physical item; receiving a first physical proximity indication that the user is within a first predefined physical proximity to the location of the first distinct physical item; in response to receiving the first physical proximity notification, automatically notifying the user that the user is within the first predefined physical proximity to the location of the first distinct physical item; receiving a first removal indication that the user has removed the first distinct physical item from the location of the first distinct physical item; and/or in response to receiving the first removal indication, automatically removing the first distinct record from the user history.

Other embodiments can include a method that can comprise accessing a user history of a user in a first database, wherein the user history can comprise a first set of records describing a first set of physical items, wherein the first set of records can comprise a first distinct record describing a first distinct physical item, and/or wherein the first set of physical items can comprise the first distinct physical item; querying a physical item database for a second distinct record, wherein the physical item database can comprise the second distinct record, and wherein the second distinct record can describe a location of the first distinct physical item; receiving a first physical proximity indication that the user is within a first predefined physical proximity to the location of the first distinct physical item; in response to receiving the first physical proximity notification, automatically notifying the user that the user is within the first predefined physical proximity to the location of the first distinct physical item; receiving a first removal indication that the user has removed the first distinct physical item from the location of the first distinct physical item; and/or in response to receiving the first removal indication, automatically removing the first distinct record from the user history.

As computer systems become more and more integrated with the physical world, users more often utilize these systems in their daily lives, especially as mobile devices with network connections to the Internet. One such instance is where the user browses an online catalogue of items, such as on a library, warehouse, or retail website. On these types of websites, users might intend to purchase items and, thus, will add the items to their online list, only to later become distracted and forget about these items or delete the items from the list. Further, some users utilize the list as a wish list or reminder list of items that they plan to obtain at a later date. Many users of computer systems also use such online lists to create reminder lists that they often neglect or forget.

In the past, this problem has been addressed by a professional, such as a concierge, librarian, stock clerk, or personal shopper, who would remember the list of items or tasks the user wanted, that they saw the user browsing, or that the user intended to perform. The professional would then remind the user about the item or task, tell the user the portion of the building where the items or tasks would be located, and may have even been able to direct them to the item or task. This solution presented its own problems, though. The professional would not have seen the user browsing at a different stores (even within the same chain or brand of stores), would only have had knowledge of the store that they worked in regularly, and could not know the stock of items or layout of every store where the items were present. Further, the professional could not be present in two stores at once to aid multiple users with the same list of items.

In the age of online catalogues, one solution to these problems is to utilize a system and method that can access a user's history and notify the user when the user is nearby items that the user has previously been interested in or tasks the user wanted to perform previously. This system could have access to the user's cumulative history, could have an encyclopedic knowledge of the items offered at every store, could know the stock of an item at every store, and could even aid multiple individuals using the same list at the same time at different establishments.

In many embodiments, the techniques described herein can provide several technological improvements. Specifically, the techniques described herein provide for the ability to access a list of records at the same time from different locations. This approach is different from previous approaches, which applied subjective human manual determinations, and/or did not allow two individuals at once to utilize the services of a personal shopper or assistant at multiple places at the same time. Moreover, this level of service does not exist in conventional approaches, which typically only operate out of one establishment and can service only one user at a time.

Further, this disclosure also contains descriptions of graphical user interfaces ("GUIs"). The GUIs discloses can facilitate a smoother, more integrated, and easier user experience for managing forgotten records in a database. These disclosed GUIs can be improvements over existing records management GUIs by making the location of forgotten records easier. In addition, the techniques described herein can solve a technical problem that arises only within the realm of computer networks, as problems with managing forgotten electronic records do not exist outside the realm of computer networks. Moreover, the techniques described herein can solve a technical problem that cannot be solved outside the context of computer networks. Specifically, the techniques described herein cannot be used outside the context of computer networks because locating electronic records sourced from a user browsing history cannot be performed without a computer.

In addition, the techniques described herein can provide a practical application and several technological improvements. In some embodiments, the techniques described herein can provide for automatic locating of lost records and notification of a user. These techniques described herein can provide a significant improvement over conventional approaches of manually reminding a user of forgotten records.

Figure 2:
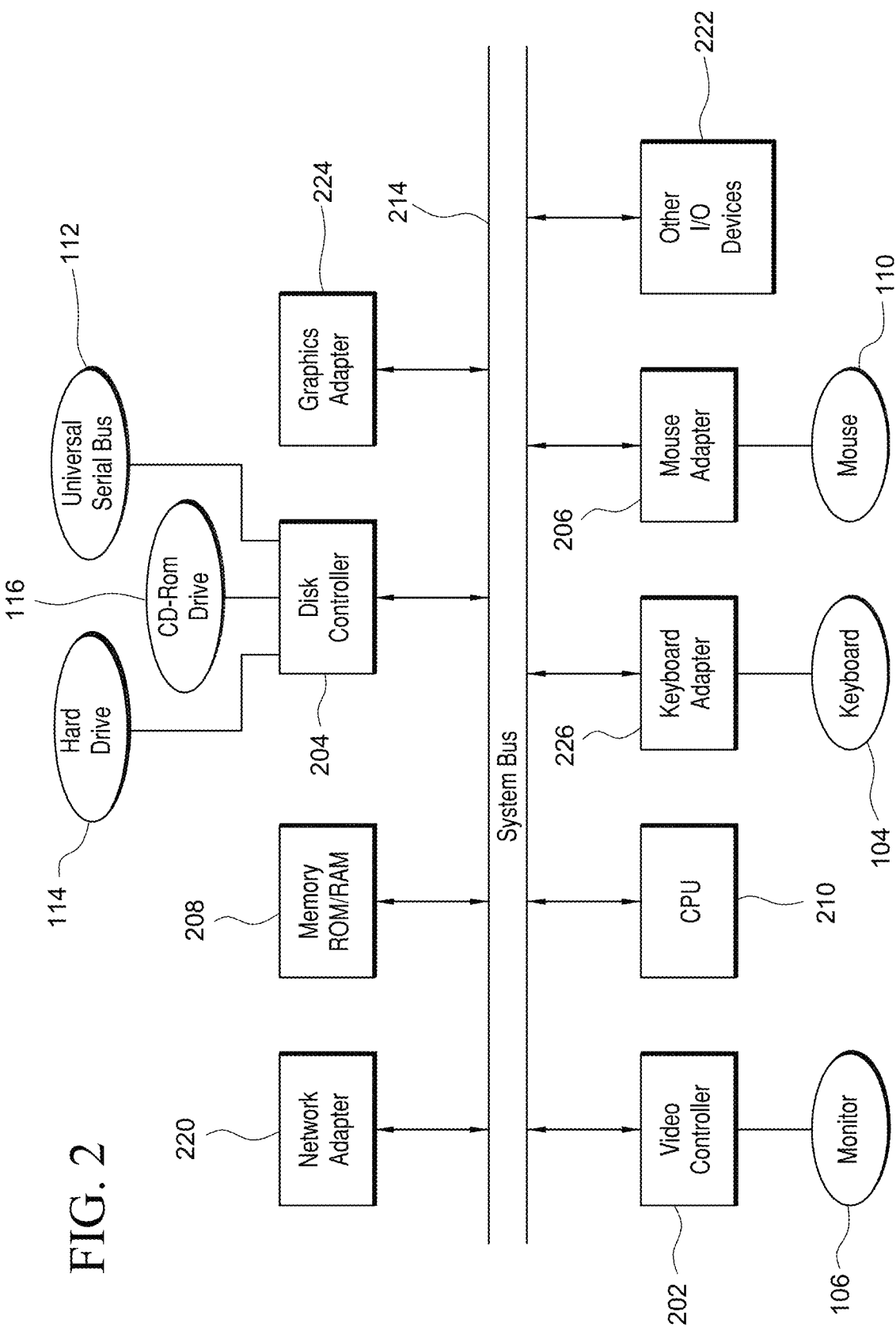
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for implementing the techniques described herein. As an example, a different or separate one of a chassis 102 (and its internal components) can be suitable for implementing the techniques described herein. Furthermore, one or more elements of computer system 100 (e.g., a refreshing monitor 106, a keyboard 104, and/or a mouse 110, etc.) can also be appropriate for implementing the techniques described herein. Computer system 100 comprises chassis 102 containing one or more circuit boards (not shown), a Universal Serial Bus (USB) port 112, a Compact Disc Read-Only Memory (CD-ROM), Digital Video Disc (DVD) drive, or Blu-Ray drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 comprises both read only memory (ROM) and random access memory (RAM). Non-volatile portions of memory storage unit 208 or the ROM can be encoded with a boot code sequence suitable for restoring computer system 100 (FIG. 1) to a functional state after a system reset. In addition, memory storage unit 208 can comprise microcode such as a Basic Input-Output System (BIOS) or Unified Extensible Firmware Interface (UEFI). In some examples, the one or more memory storage units of the various embodiments disclosed herein can comprise memory storage unit 208, a USB-equipped electronic device, such as, an external memory storage unit (not shown) coupled to universal serial bus (USB) port 112 (FIGS. 1-2), hard drive 114 (FIGS. 1-2), and/or CD-ROM, DVD drive, or Blu-Ray drive 116 (FIGS. 1-2). In the same or different examples, the one or more memory storage units of the various embodiments disclosed herein can comprise an operating system, which can be a software program that manages the hardware and software resources of a computer and/or a computer network. The operating system can perform basic tasks such as, for example, controlling and allocating memory, prioritizing the processing of instructions, controlling input and output devices, facilitating networking, and managing files. Some examples of common operating systems can comprise various versions/distributions of Microsoft® Windows® operating system (OS), Apple® OS X, UNIX® OS, and Linux® OS.

In various examples, portions of the memory storage module(s) of the various embodiments disclosed herein (e.g., portions of the non-volatile memory storage module (s)) can be encoded with a boot code sequence suitable for restoring computer system 100 (FIG. 1) to a functional state after a system reset. In addition, portions of the memory storage module(s) of the various embodiments disclosed herein (e.g., portions of the non-volatile memory storage module(s)) can comprise microcode such as a Basic Input-Output System (BIOS) operable with computer system 100 (FIG. 1). In the same or different examples, portions of the memory storage module(s) of the various embodiments disclosed herein (e.g., portions of the non-volatile memory storage module(s)) can comprise an operating system, which can be a software program that manages the hardware and software resources of a computer and/or a computer network. The BIOS can initialize and test components of computer system 100 (FIG. 1) and load the operating system. Meanwhile, the operating system can perform basic tasks such as, for example, controlling and allocating memory, prioritizing the processing of instructions, controlling input and output devices, facilitating networking, and managing files. Exemplary operating systems can comprise one of the following: (i) Microsoft® Windows® operating system (OS) by Microsoft Corp. of Redmond, Wash., United States of America, (ii) Mac® OS X by Apple Inc. of Cupertino, Calif., United States of America, (iii) UNIX® OS, and (iv) Linux® OS. Further exemplary operating systems can comprise one of the following: (i) the iOS® operating system by Apple Inc. of Cupertino, Calif., United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, Calif., United States of America, (v) the Windows Mobile™ operating system by Microsoft Corp. of Redmond, Wash., United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processors of the various embodiments disclosed herein can comprise CPU 210.

Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs. In many embodiments, an application specific integrated circuit (ASIC) can comprise one or more processors or microprocessors and/or memory blocks or memory storage.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1-2) and mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for refreshing monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM drive 116 (FIGS. 1-2). In other embodiments, distinct units can be used to control each of these devices separately.

In some embodiments, network adapter 220 can comprise and/or be implemented as a WNIC (wireless network interface controller) card (not shown) plugged or coupled to an expansion port (not shown) in computer system 100 (FIG. 1). In other embodiments, the WNIC card can be a wireless network card built into computer system 100 (FIG. 1). A wireless network adapter can be built into computer system 100 by having wireless communication capabilities integrated into the motherboard chipset (not shown), or implemented via one or more dedicated wireless communication chips (not shown), connected through a PCI (peripheral component interconnector) or a PCI express bus of computer system 100 (FIG. 1) or USB port 112 (FIG. 1). In other embodiments, network adapter 220 can comprise and/or be implemented as a wired network interface controller card (not shown).

Although many other components of computer system 100 (FIG. 1) are not shown, such components and their interconnection are well known to those of ordinary skill in the art. Accordingly, further details concerning the construction and composition of computer system 100 and the circuit boards inside chassis 102 (FIG. 1) are not discussed herein.

When computer system 100 in FIG. 1 is running, program instructions stored on a USB-equipped electronic device connected to USB port 112, on a CD-ROM or DVD in CD-ROM and/or DVD drive 116, on hard drive 114, or in memory storage unit 208 (FIG. 2) are executed by CPU 210 (FIG. 2). A portion of the program instructions, stored on these devices, can be suitable for carrying out at least part of the techniques described herein.

Although computer system 100 is illustrated as a desktop computer in FIG. 1, there can be examples where computer system 100 can take a different form factor while still having functional elements similar to those described for computer system 100. In some embodiments, computer system 100 can comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 can comprise a portable computer, such as a laptop computer. In certain other embodiments, computer system 100 can comprise a mobile device, such as a smart phone or a tablet. In certain additional embodiments, computer system 100 can comprise an embedded system. It should also be understood that a particular configuration of computer system 100 may or may not contain each of the items shown in FIG. 1 or 2 or may in fact contain multiple of each of the items shown in FIG. 1 or 2. For example, certain implementations of computer system 100 may not contain a CD-ROM, DVD, or Blu-Ray drive 116. Other implementations of computer system 100 may contain two CD-ROM, DVD, or Blu-Ray drives 116. Other implementations of computer system 100 can contain 2 or more monitors 106. Other implementations of computer system 100 could contain no monitors. Other implementations of computer system 100 can contain equivalents to certain items. For example, hard drive 114 can be replaced or augmented by a solid-state drive (SSD).

Figure 3:
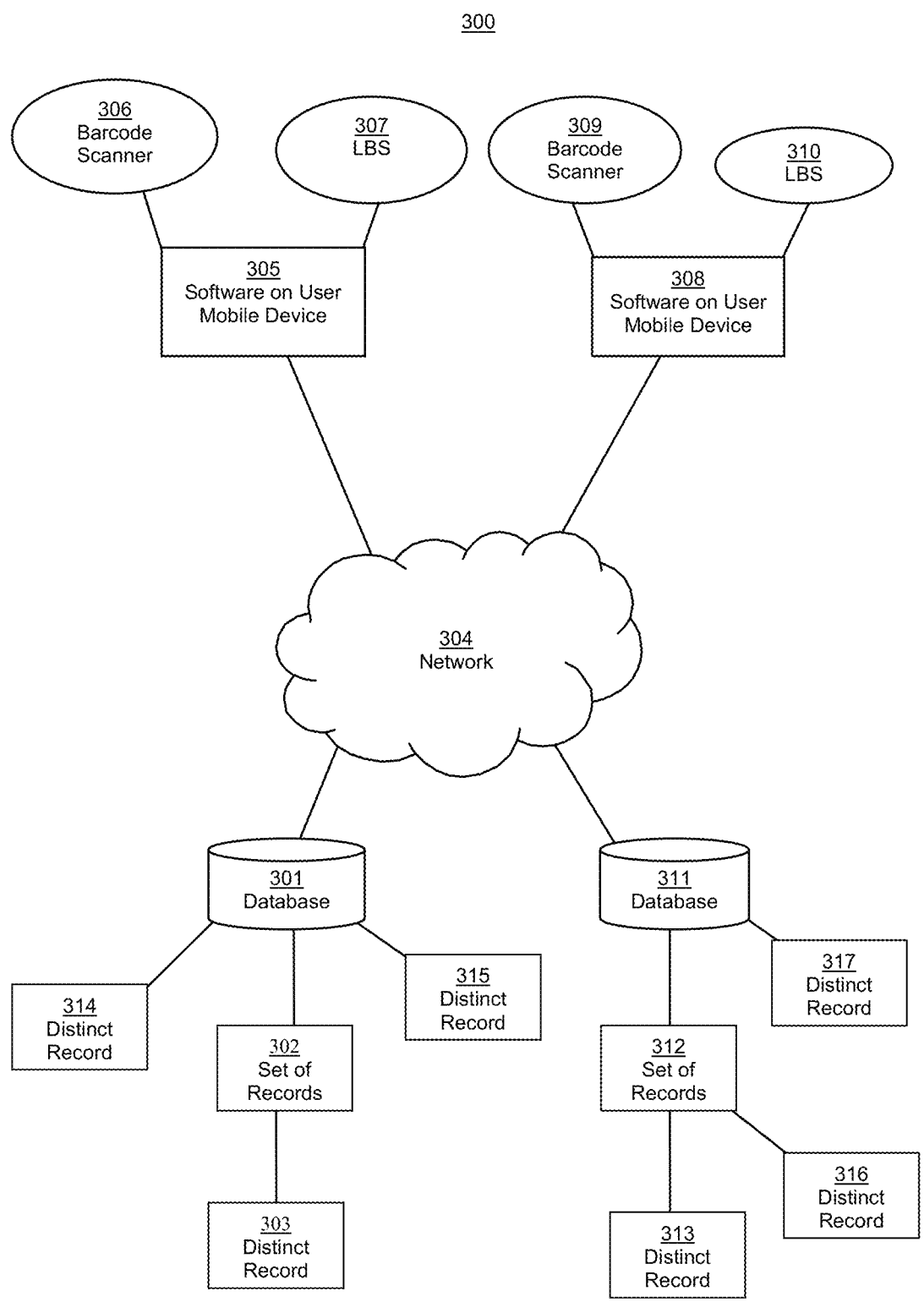
FIG. 3 illustrates a block diagram of an exemplary notification system.

Turning ahead in the drawings, FIG. 3 illustrates a block diagram of an exemplary embodiment of the disclosed system 300 that can be employed for record management as described in greater detail below. System 300 is merely exemplary and embodiments of the system are not limited to the embodiments presented herein. System 300 can be employed in many different embodiments or examples not specifically depicted or described herein. In some embodiments, certain elements or modules of system 300 can perform various procedures, processes, and/or activities. In these or other embodiments, the procedures, processes, and/or activities can be performed by other suitable elements or modules of system 300.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

In some embodiments, databases 301, 311 can each comprise sets of records 302, 312, respectively, which in turn can comprise a distinct record 303 (for set of records 302) or more than one distinct record 313, 316 (for set of records 312). In some embodiments, databases 301, 311 can comprise a distinct record 317 (for database 311) or more than one distinct record 314, 315 (for database 301). In some embodiments, databases 301, 311 can be accessed or queried through network 304.

Network 304 can be implemented using any suitable manner of wired and/or wireless communication, and can include the Internet and/or an intranet. Accordingly, system 300 can comprise any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can comprise Bluetooth, Zigbee, Wireless Universal Serial Bus (USB), Z-Wave, etc.; exemplary LAN and/or WAN protocol(s) can comprise Institute of Electrical and Electronic Engineers (IEEE) 802.3 (also known as Ethernet), IEEE 802.11 (also known as WiFi), etc.; and exemplary wireless cellular network protocol(s) can comprise Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can comprise wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can comprise wireless communication hardware including, for example, one or more radio transceivers, one or more infrared transceivers, etc. Additional exemplary communication hardware can comprise one or more networking components (e.g., modulator-demodulator components, gateway components, etc.).

Databases 301, 311 can each comprise a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

Further, in some embodiments, network 304 can allow software 305, 308 to access or query databases 301, 311. In some embodiments, software 305, 308 can each comprise barcode scanner modules 306, 309, respectively, or location based services (LBS) modules 307, 310, respectively. In some embodiments, LBS 307, 310 can comprise any type of location based service module such as, for example, global positioning (GPS), Wi-Fi positioning (WiFi), a radio frequency identification (RFID), near field communication (NFC), Bluetooth beacons, ultra-wide band (UWB) technology, infrared (IR) beacons or other such location based systems known heretofore or invented. In some embodiments, databases 301, 311 can be simultaneously or at separate times accessed or queried by more than one software 305, 308.

Software 305, 308 can be located on user mobile electronic devices. Exemplary mobile electronic devices can comprise (i) an iPod®, iPhone®, iTouch®, iPad®, MacBook® or similar product by Apple Inc. of Cupertino, Calif., United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile electronic device can comprise an electronic device configured to implement one or more of (i) the iPhone® operating system by Apple Inc. of Cupertino, Calif., United States of America, (ii) the Blackberry® operating system by Research In Motion (RIM) of Waterloo, Ontario, Canada, (iii) the Palm® operating system by Palm, Inc. of Sunnyvale, Calif., United States, (iv) the Android™ operating system developed by the Open Handset Alliance, (v) the Windows Mobile™ operating system by Microsoft Corp. of Redmond, Wash., United States of America, or (vi) the Symbian™ operating system by Nokia Corp. of Keilaniemi, Espoo, Finland.

Further still, the term "wearable user computer device" as used herein can refer to an electronic device with the capability to present audio and/or visual data (e.g., text, images, videos, music, etc.) that is configured to be worn by a user and/or mountable (e.g., fixed) on the user of the wearable user computer device (e.g., sometimes under or over clothing; and/or sometimes integrated with and/or as clothing and/or another accessory, such as, for example, a hat, eyeglasses, a wrist watch, shoes, etc.). In many examples, a wearable user computer device can comprise a mobile electronic device, and vice versa. However, a wearable user computer device does not necessarily comprise a mobile electronic device, and vice versa.

In specific examples, a wearable user computer device can comprise a head mountable wearable user computer device (e.g., one or more head mountable displays, one or more eyeglasses, one or more contact lenses, one or more retinal displays, etc.) or a limb mountable wearable user computer device (e.g., a smart watch). In these examples, a head mountable wearable user computer device can be mountable in close proximity to one or both eyes of a user of the head mountable wearable user computer device and/or vectored in alignment with a field of view of the user.

In more specific examples, a head mountable wearable user computer device can comprise (i) Google Glass™ product or a similar product by Google Inc. of Menlo Park, Calif., United States of America; (ii) the Eye Tap™ product, the Laser Eye Tap™ product, or a similar product by ePI Lab of Toronto, Ontario, Canada, and/or (iii) the Raptyr™ product, the STAR 1200™ product, the Vuzix Smart Glasses M100™ product, or a similar product by Vuzix Corporation of Rochester, N.Y., United States of America. In other specific examples, a head mountable wearable user computer device can comprise the Virtual Retinal Display™ product, or similar product by the University of Washington of Seattle, Wash., United States of America. Meanwhile, in further specific examples, a limb mountable wearable user computer device can comprise the iWatch™ product, or similar product by Apple Inc. of Cupertino, Calif., United States of America, the Galaxy Gear or similar product of Samsung Group of Samsung Town, Seoul, South Korea, the Moto 360 product or similar product of Motorola of Schaumburg, Ill., United States of America, and/or the Zip™ product, One™ product, Flex™ product, Charge™ product, Surge™ product, or similar product by Fitbit Inc. of San Francisco, Calif., United States of America.

Figure 4:
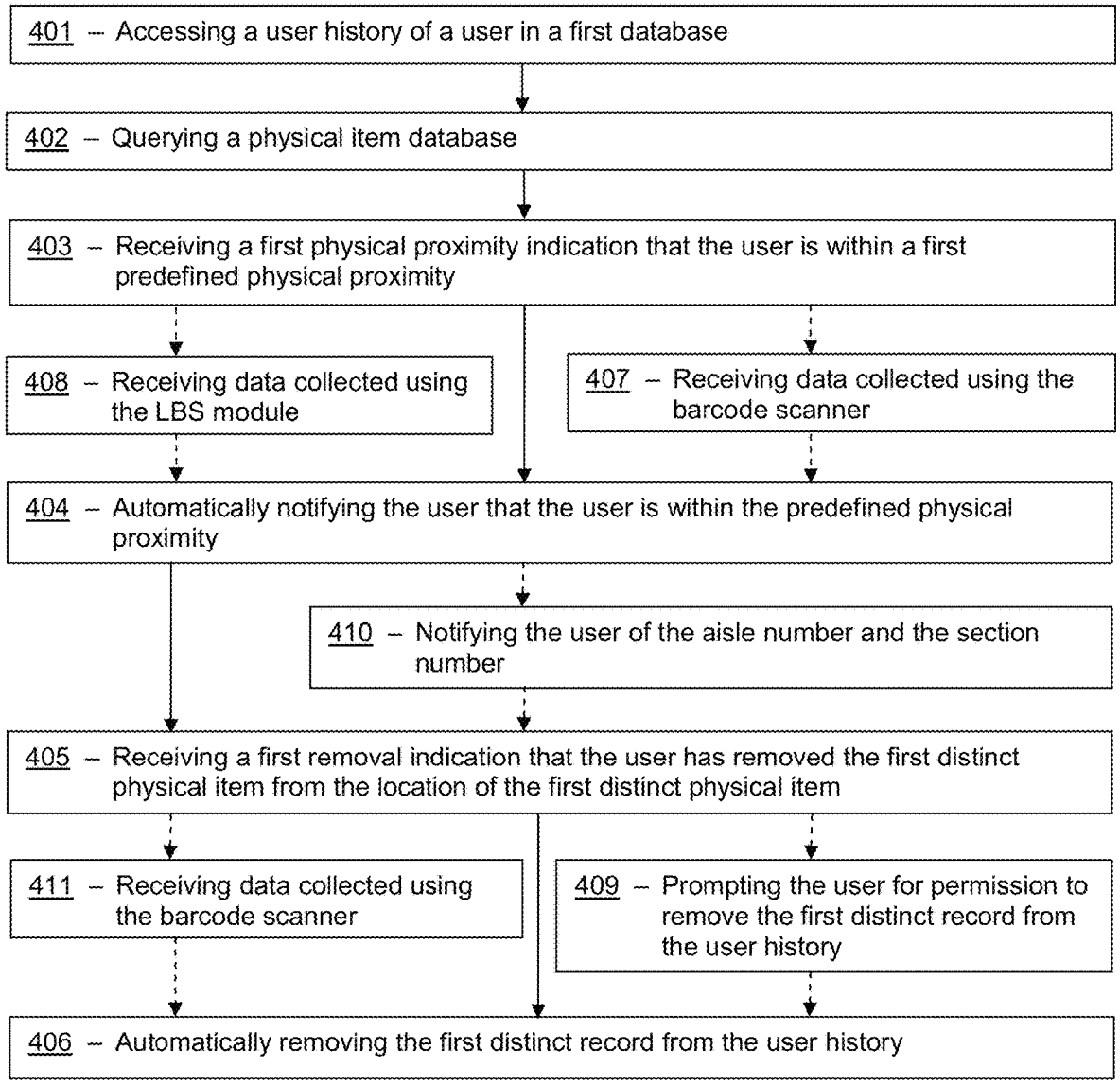
FIG. 4 illustrates a flowchart for an exemplary method.

Turning now to FIG. 4, a flowchart 400 displaying an exemplary embodiment of a disclosed system and/or method is shown. Flowchart 400 is merely exemplary and is not limited to the embodiments presented herein. Flowchart 400 can be employed in many different embodiments or examples not specifically depicted or described herein. In some embodiments, activities or blocks of flowchart 400 can be performed in an order presented. In other embodiments, activities of flowchart 400 can be performed in any suitable order. In still other embodiments, one or more activities of flowchart 400 can be combined or skipped. In many embodiments, system 300 (FIG. 3) can be suitable to perform flowchart 400 and/or one or more activities or blocks of flowchart 400. In these or other embodiments, one or more activities or blocks of flowchart 400 can be implemented as one or more computer instructions configured to run at one or more processing modules and configured to be stored at one or more non-transitory memory storage module. Such non-transitory memory storage modules can be part of a computer system, as described above. The processing module(s) can be similar or identical to processing module(s) described above with respect to computer system 100 (FIG. 1) and computer system 200 (FIG. 2).

In some embodiments, flowchart 400 and other blocks in flowchart 400 can include using a distributed network including distributed memory architecture to perform the associated activity. This distributed architecture can reduce the impact on the network and system resources to reduce congestion in bottlenecks while still allowing data to be accessible from a central location.

In some embodiments, the system and/or method can comprise block 401 for accessing a user history of a user in a first database. In some embodiments, a user history can comprise many sources or only one source. In some embodiments, the user history can be sourced from an abandoned or saved electronic shopping cart, an abandoned or saved online wish list, an abandoned or saved online basket, an abandoned or saved online library check out list, and/or an abandoned or saved electronic to-do list. In some embodiments a user history can comprise one or more databases such as databases 301, 302 (FIG. 3). In some embodiments, a user history can comprise a first set of records describing a first set of physical items. In some embodiments, a user history is stored as an HTTP cookie, a query string in a URL, and/or a session object as read by a server-side script engine, such as Active Server Pages® software. In some embodiments a set of records can comprise a set of records 302 (FIG. 3) and/or a set of records 312 (FIG. 3).

In some embodiments, a set of records can describe a set of physical items or a distinct physical item. A set of records describes a set of physical items or a physical item when the set contains information about the set of physical items or the distinct physical item. In some embodiments, information about or describing a set of physical items can comprise price information, a physical description, an image, multiple images, a serial number, multiple serial numbers, a make or model number, multiple make or model numbers, and/or any other suitable method for describing a set of physical items or a physical item. In some embodiments, a set of physical items can comprise physical incarnations of the items described in a set of records. In some embodiments, physical incarnations can be one or more products, books, periodicals, microfiche, videos, any other type of item that can be checked out of a library, tasks, a task, implements used to complete the tasks, and/or an implement used to complete the tasks.

In some embodiments, a first set of records can comprise only one distinct record. This would correspond with an embodiment in which set of records 302, comprises a distinct record 303 (FIG. 3). In other embodiments, a set of records 312 (FIG. 3) can comprise multiple records 313, 316 (FIG. 3). In some embodiments, a distinct record can describe a first distinct physical item. For example, a distinct record can describe a distinct physical item when it contains information about or describing the distinct physical item. Information about or describing a distinct physical item can comprise price information, a physical description, an image, multiple images, a serial number, multiple serial numbers, a make or model number, multiple make or model numbers, and/or any other suitable method for describing a physical item. In some embodiments, a distinct physical item can comprise physical incarnations of an item described in a distinct record. This can be a product in an embodiment incorporating an abandoned or saved electronic shopping cart, an abandoned or saved online wish list, and/or an abandoned or saved online basket. In other embodiments incorporating an abandoned or saved online library check out list, a set of physical items can be books, periodicals, microfiche, videos, DVDs, and/or any other type of item that can be checked out of a library. In other embodiments incorporating an electronic to-do list, a distinct physical item can be a task on a to-do list and/or an implement used to complete a task on a to-do list. In some embodiments, a set of physical items can comprise a distinct physical item.

In some embodiments, after block 401, a system and/or method comprises block 402 for querying a physical item database for a second distinct record. As shown above in FIG. 3, in some embodiments, a physical item database can be a database such as database 301 and/or an additional database such as database 302 (FIG. 3). In some embodiments, a physical item database can comprise a set of records 302, 312 (FIG. 3) and/or a distinct record 314, 315 (FIG. 3). In some embodiments, a user history can comprise a set of records describing a set of physical items. As shown above in FIG. 3, in some embodiments a set of records can be set of records 302 (FIG. 3) or set of records 312 (FIG. 3).

In some embodiments, a set of records and/or a distinct record can describe a location of a set of physical items or a distinct physical item, respectively. A set of records and/or a distinct record can describe a location of a set of physical items or a distinct physical item, respectively, when they contain information about or describing a location of distinct physical item(s). In some embodiments, a set of records or distinct record can comprise a computer aided design/ drafting (CAD) file or files. CAD files can be produced on any number of commercial aided design software commonly available today such as, for example, AutoCAD® software or AllyCAD® software. In some embodiments, information about or describing a location of distinct physical item(s) can comprise information collected by an LBS module and/or a barcode scanner. In some embodiments, a location of a distinct item can be described using an aisle number and a section number. In some embodiments, an aisle number can describe an aisle such as, for example, an aisle in a library or a retail building. In some embodiments, an aisle comprises a shelf within the aisle. In some embodiments, a section number can describe a portion of a shelf or a portion of an aisle. In some embodiments, a section number describes a rectangular section on a face of a shelf ranging from approximately 5-foot by 5-foot to approximately 1-foot by 1-foot.

In some embodiments, after block 402, a system and/or method can comprise block 403 for receiving a first physical proximity indication that a user is within a first predefined physical proximity to a location of a first distinct physical item. In some embodiments, a physical proximity indication can comprise a signal from software 305, 308 (FIG. 3) that a user is within physical proximity to a distinct item. In some embodiments, being within a physical proximity to a distinct item can comprise being near an item or holding an item. In some embodiments, physical proximity can comprise a geofence and being within physical proximity can comprise being within the geofence. In some embodiments, a system and/or method can further comprise block 407 for receiving data collected using a barcode scanner. In some embodiments, data collected using a bar code scanner can be a distinct record, a set of records, a CAD file, and/or a set of CAD files. In some embodiments, a system and/or method can further comprise block 408 for receiving data collected using a LBS module such as, for example, connecting to a WiFi network. Blocks 407 and/or 408 can be optional, and block 403 can be performed before or after one or both of blocks 407 or 408. When block 403 is performed after one or both of blocks 407 or 408, the data from blocks 407 or 408 can be used as at least part of the first physical proximity indication in block 403.

In some embodiments, a system and/or method can comprise block 404 for automatically notifying a user that a user is within a first predefined physical proximity. In some embodiments, notifying a user can comprise a notification on a graphical user interface ("GUI") of software 305, 308 (FIG. 3) such as, for example, a pop-up or a push notification. In some embodiments, automatically notifying a user can be performed in response to block 403 or independently of block 403, and/or after blocks 407 and/or 408. In some embodiments, after performing block 404, a system and method can further comprise block 410 notifying a user of an aisle number and a section number. In some embodiments, notifying a user can comprise a notification on a GUI of software 305, 308 (FIG. 3) such as, for example, a pop-up or push notification.

Figure 5:
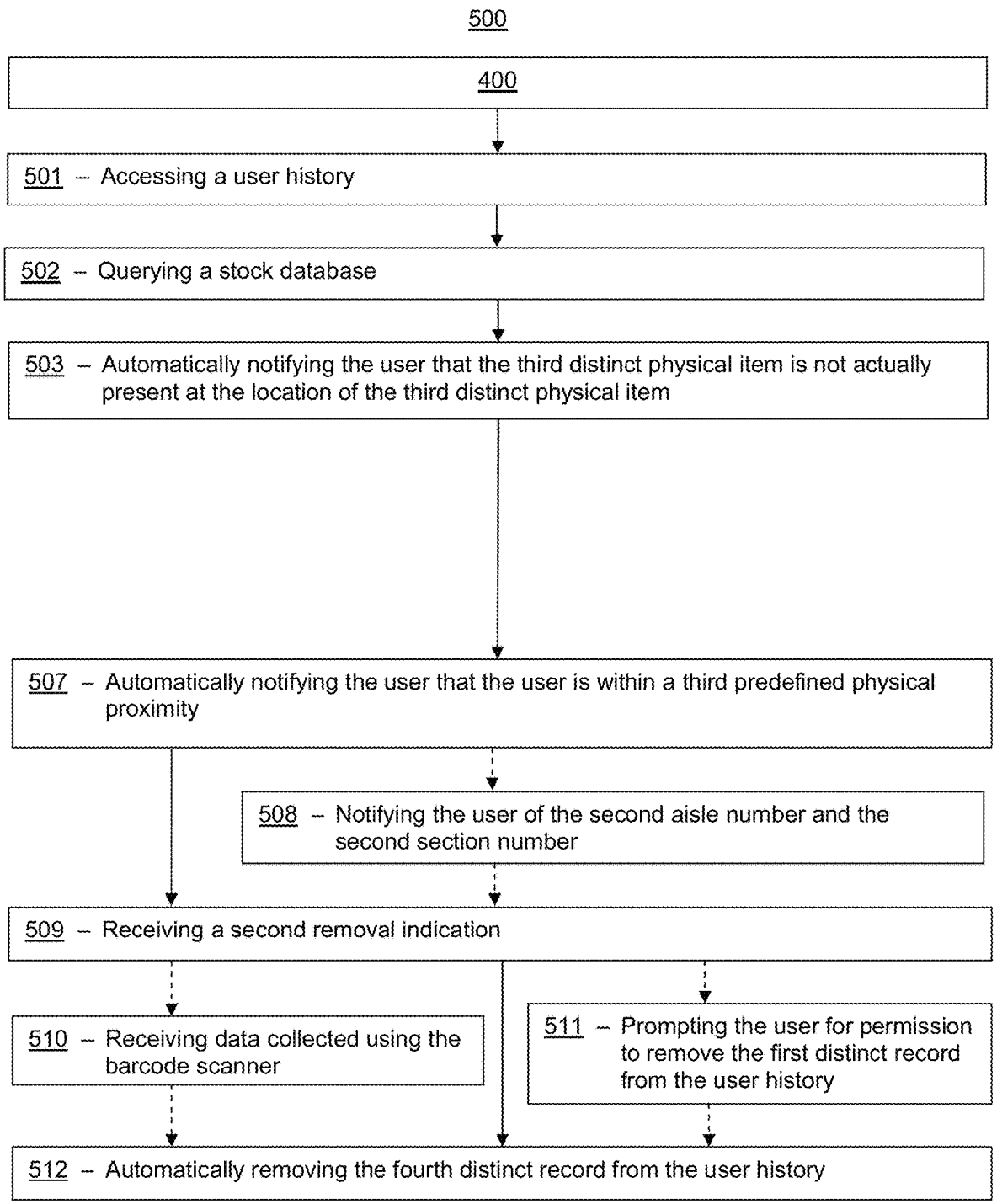
FIG. 5 illustrates a flowchart for an exemplary method.

In many embodiments, a GUI can be used to receive other inputs from a user and/or present other elements of the invention to the user. For example, a GUI can also be implemented in block 404, 405, 409, 410, 503 (FIG. 5), 507 (FIG. 5), 508 (FIG. 5), 509 (FIG. 5), and/or 511 (FIG. 5). In various embodiments, a software application on a mobile device of a user can comprise software 305, 308 (FIG. 3). In many embodiments, a GUI can be part of and/or displayed by a software application on a mobile device of a user, which also can be part of system 300 (FIG. 3). In some embodiments, a GUI can comprise text and/or graphics (image) based user interfaces. In the same or different embodiments, a GUI can comprise a heads up display ("HUD"). When a GUI comprises a HUD, the GUI can be projected onto glass or plastic, displayed in midair as a hologram, or displayed on monitor 106 (FIG. 1). In various embodiments, a GUI can be color or black and white. In many embodiments, a GUI can comprise an application running on a computer system, such as computer system 100, a user device, and/or a server computer. In the same or different embodiments, a GUI can comprise a website accessed through network 304 (FIG. 3). In some embodiments, a GUI can comprise an eCommerce website. In the same or different embodiments, a GUI can be displayed as or on a virtual reality (VR) and/or augmented reality (AR) system or display.

In some embodiments, after blocks 404 and/or 410, a system and/or method can comprise block 405 for receiving a first removal indication that a user has removed a first distinct physical item from a location of a first distinct physical item. In some embodiments, a removal indication can comprise a user completing a transaction, checking out an item from a library, and/or completing a task. In some embodiments, receiving a first removal indication can incorporate the system and/or method disclosed in U.S. Pat. Nos. 9,818,091; 9,607,486, and/or U.S. Patent App. No. 2014/ 0214596, which are all herein incorporated by reference in their entirety. In some embodiments, block 405 can further comprise applying any discounts and/or coupons applicable to a first distinct physical item.

In some embodiments, a system and/or method can further comprise block 409 prompting a user for permission to remove a first distinct record from a user history, after block 405. In some embodiments, prompting a user for permission to remove a distinct record from a user history can comprise a notification on a GUI of software 305, 308 (FIG. 3) such as, for example, a pop-up or push notification. In some embodiments, a permission to remove a first distinct record can comprise receiving a response from a user through a GUI of software 305, 308 (FIG. 3).

In some embodiments, a system and/or method can comprise block 411 for receiving data collected using a barcode scanner 309 (FIG. 3). In some embodiments, data collected using a bar code scanner can be a distinct record, a set of records, a CAD file, a set of CAD files, and/or information describing a transaction. In some embodiments, information describing a transaction can comprise completing a transaction over a network 304 (FIG. 3) such as, for example, over an internet. In some embodiments, receiving data collected using a barcode scanner can incorporate a system and/or method disclosed in U.S. Pat. Nos. 9,818,091; 9,607,486, and/or U.S. Patent App. No. 2014/0214596, incorporated by reference above. In some embodiments, a system and/or method can comprise only one of, both of, and/or none of blocks 409 and/or 411. In embodiments where a system and/or method comprises at least block 411, block 405 can be performed before and/or after block 411. When block 405 is performed after block 411, data from block 411 can be used as at least part of a removal indication in block 405.

In some embodiments, a system and/or method can further comprise block 406 for automatically removing a first distinct record from a user history. In some embodiments, block 406 can be performed in response to or independently of one or more of blocks 405, 409, 411.

Turning now to FIG. 5, a flowchart 500 of an exemplary embodiment of a disclosed system and/or method is shown. In some embodiments, system and/or method 500 can comprise system and/or method 400 (FIG. 4), which can occur before blocks of system and/or method 500 in FIG. 5.

In some embodiments, a system and/or method can comprise block 501 for accessing a user history. In some embodiments, accessing a user history can comprise querying a database 301, 311 (FIG. 3) through a network 304 (FIG. 3) such as, for example, through the Internet.

In some embodiments, after block 501, a system and/or method further comprises block 502 for querying a stock database. In some embodiments, a stock database can comprise a set of records and/or a distinct record such as database 301, 311 (FIG. 3). In some embodiments, a stock database can comprise a set of records and/or a distinct record describing whether a distinct physical item (e.g., a third distinct physical item) is actually present at a location of a distinct physical item. A set of and/or a distinct record can describe whether a third distinct physical item is actually present at a location of a third distinct physical item when it contains information pertaining to a number of items present at a location. For example, a distinct record can contain information stating that there are zero third distinct physical items present at a location, and/or that the third distinct physical item is out of stock.

In some embodiments, after block 502, a system and/or method further comprises block 503 for notifying a user that a third distinct physical item is not actually present at a location of a third distinct physical item. In some embodiments, notifying a user can occur automatically and/or can comprise a pop-up notification on a GUI of software 305, 308 (FIG. 3). In some embodiments, a system and/or method further comprises optional block 503 notifying a user that a user is within a predefined physical proximity. In some embodiments, notifying a user can comprise a notification on a GUI software 305, 308 (FIG. 3) such as, for example, a pop-up or push notification. In some embodiments, physical proximity can comprise a geofence, and being within physical proximity can comprise being within the geofence.

In some embodiments, after block 503, a system and/or method comprises block 507 for notifying a user that the user is within a third predefined physical proximity of a fourth distinct physical item. In some embodiments, notifying a user can occur automatically and/or can comprise a notification on a GUI of software 305, 308 (FIG. 3) such as, for example, a pop-up or push notification. In some embodiments, being within physical proximity to a distinct item can comprise being near an item and/or holding an item. In some embodiments, physical proximity can comprise a geofence, and being within physical proximity can comprise being within the geofence. In some embodiments, a fourth distinct physical item can be similar to a third distinct physical item, but differ in number, brand, size, and/or quantity. As a non-limiting example, if a third distinct physical item was a package of 4 paper towels, a fourth physical item, which is similar to the third distinct physical item, could be a larger or smaller package of a same paper towels, another brand of paper towels, and/or even a same brand in an extra-large and/or extra-small size.

In some embodiments, after block 507, a system and/or method can comprise block 508 for notifying a user of a second aisle number and a second section number. In some embodiments, a location of a third distinct item can be described using an aisle number and a section number. In some embodiments, an aisle number can describe an aisle such as, for example, an aisle in a library and/or a retail building. In some embodiments, an aisle comprises a shelf In some embodiments, a section number can describe a portion of a shelf or a portion of an aisle. In some embodiments, a section number describes a rectangular section on a face of a shelf ranging from approximately 5-foot by 5-foot to approximately 1-foot by 1-foot. In some embodiments, block 508 is optional.

In some embodiments, after blocks 507 and/or 508, a system and/or method can comprise block 509 for receiving a removal indication. In some embodiments, a removal indication can comprise a user completing a transaction, checking out an item from a library, and/or completing a task. In some embodiments, a system and/or method can further comprise block 511 prompting a user for permission to remove a first distinct record from a user history. In some embodiments, prompting a user for permission to remove a distinct record from a user history can comprise a notification on a GUI of software 305, 308 (FIG. 3) such as, for example, a pop-up or a push notification. In some embodiments, a permission to remove a third distinct record can comprise receiving a response from a user through a GUI of software 305, 308 (FIG. 3). In some embodiments, block 509 can further comprise applying any discounts or coupons applicable to a first distinct physical item.

In some embodiments, a system and/or method can comprise block 510 for receiving data collected using a barcode scanner 309 (FIG. 3). In some embodiments, data collected using a bar code scanner can be a distinct record, a set of records, a CAD file, a set of CAD files, or information describing a transaction. In some embodiments, information describing a transaction can comprise completing a transaction over a network 304 (FIG. 3) such as, for example, over an internet. In some embodiments, receiving data collected using a barcode scanner can incorporate a method disclosed in U.S. Pat. Nos. 9,818,091; 9,607,486, and U.S. Patent App. No. 2014/0214596, incorporated by reference above. In some embodiments, a system and/or method can comprise only one of, both of, or none of blocks 510 and 511. In embodiments where a system and/or method comprises at least block 510, block 509 can be performed before or after block 510. When block 509 is performed after block 510, data from block 510 can be used as at least a part of a removal indication in block 509.

In some embodiments, the system and/or method can further comprise block 512 automatically removing a distinct record from a user history, where a distinct record describes a third distinct physical item, which was not present on a shelf and/or out of stock. In some embodiments block 512 can be performed in response to or independently of one or more of blocks 509, 510, 511.

Figure 6:
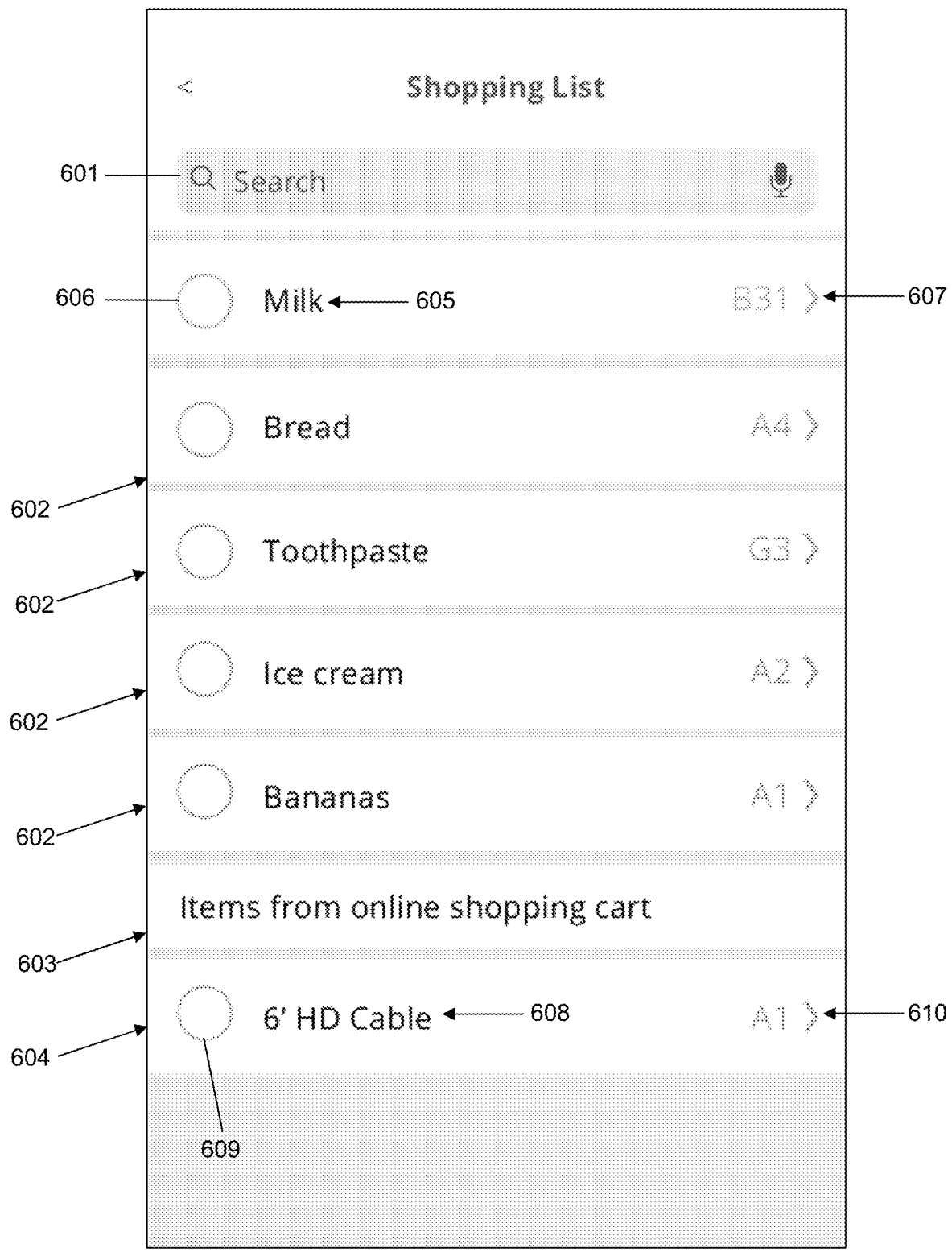
FIGS. 6-7 illustrate exemplary graphical user interfaces according to embodiments.

Turning now to FIG. 6, an exemplary embodiment of a GUI 600 is shown. In many embodiments, GUI 600 can display records in a user history as described in block 401, records in a user history as described in block 501, records added manually by a user, and/or records generated using systems and/or methods in application Ser. No. 16/261,089, which is herein incorporated by this reference in its entirety. In some embodiments, GUI 600 can comprise search box 601, a representation of a record 602, a history header 603, and/or a historical record 604. In various embodiments, a search box 601 can comprise a text entry box that allows a user to enter a search query into search box 601. In the same or different embodiments, search box 601 can be configured to search a catalogue of distinct records describing physical items. In some embodiments, a catalogue of distinct records describing physical items can comprise a product catalogue of an eCommerce retailer, a list of items for sale in a grocery/supermarket, and/or a library catalogue. In many embodiments, search box 601 can be configured to search a list of items and/or records displayed in GUI 600. In some embodiments, a representation of a record 602 can comprise records added by a user and/or records sourced from a user history. In various embodiments, a history header 603 can comprise a text and/or image label that indicates a start of records sourced from a user history that are displayed on GUI 600.

In many embodiments, a representation of a record 602 can comprise description 605, selectable element 606, and/or item location indicator 607. In some embodiments, description 605 can comprise text describing an item represented by representation of a record 602 and/or an image of an item represented by representation of a record 602. In many embodiments, selectable element 606 can be configured to be selected by a user. In various embodiments, after a user selects selectable element 606, an LBS module can locate the user at a location of an item represented by representation of a record 602. In many embodiments, after a user selects selectable element 606, blocks 406 (FIG. 4), 409 (FIG. 4), 509 (FIG. 5), 511 (FIG. 5), and/or 512 (FIG. 5) can be performed. In some embodiments, selection of a selectable element 606 can be considered as a response to, and therefore complete, blocks 405 (FIG. 4), 409 (FIG. 4), 509 (FIG. 5), and/or 511 (FIG. 5) In the same or different embodiments, selection of selectable element 606 can cause a representation of a record 602 associated with the selectable element 606 to be removed from or greyed out on GUI 600. In some embodiments, item location indicator 607 can comprise a textual and/or image description of an item location. For example, a textual and/or image description can comprise a physical description of the item location, one or more images of the item location, one or more addresses of the item location, one or more GPS coordinates of the item location, one or more values associated with a geographic coordinate system of the item location, one or more computer aided design (CAD) files depicting the item location, one or more aisle numbers of the item location, and/or one or more section numbers of the item location. In many embodiments, item location indicator 607 can be configured to be selected by a user. In various embodiments, after a user selects item location indicator 607, a map can be shown to a user indicating a location of an item associated with a representation of a record 602.

In many embodiments, historical record 604 can comprise a representation of a record sourced from a user history, as described in blocks 401 (FIG. 4) and 501 (FIG. 5). In various embodiments, historical record 604 can comprise historical description 608, historical selectable element 609, and/or historical item location indicator 610. In some embodiments, historical description 608 can comprise text describing an item represented by a historical record 604 and/or an image of an item represented by a historical record 604. In many embodiments, historical selectable element 609 can be configured to be selected by a user. In various embodiments, after a user selects historical selectable element 609, an LBS module can locate the user at a location of an item represented by a historical record 604. In many embodiments, after a user selects historical selectable element 609, blocks 406 (FIG. 4), 409 (FIG. 4), 509 (FIG. 5), 511 (FIG. 5), and/or 512 (FIG. 5) can be performed. In some embodiments, selection of a historical selectable element 606 can be considered as a response to, and therefore complete, blocks 405 (FIG. 4), 409 (FIG. 4), 509 (FIG. 5), and/or 511 (FIG. 5) In the same or different embodiments, selection of a historical selectable element 609 can cause a representation of a historical record 604 associated with the historical selectable element 609 to be removed from or greyed out on GUI 600. In some embodiments, historical item location indicator 610 can comprise a textual and/or image description of an item location. For example, a textual and/or image description can comprise a physical description of the item location, one or more images of the item location, one or more addresses of the item location, one or more GPS coordinates of the item location, one or more values associated with a geographic coordinate system of the item location, one or more computer aided design (CAD) files depicting the item location, one or more aisle numbers of the item location, and/or one or more section numbers of the item location. In many embodiments, historical item location indicator 610 can be configured to be selected by a user. In various embodiments, after a user selects historical item location indicator 610, a map can be shown to a user indicating a location of an item associated with a historical record 604.

Figure 7:
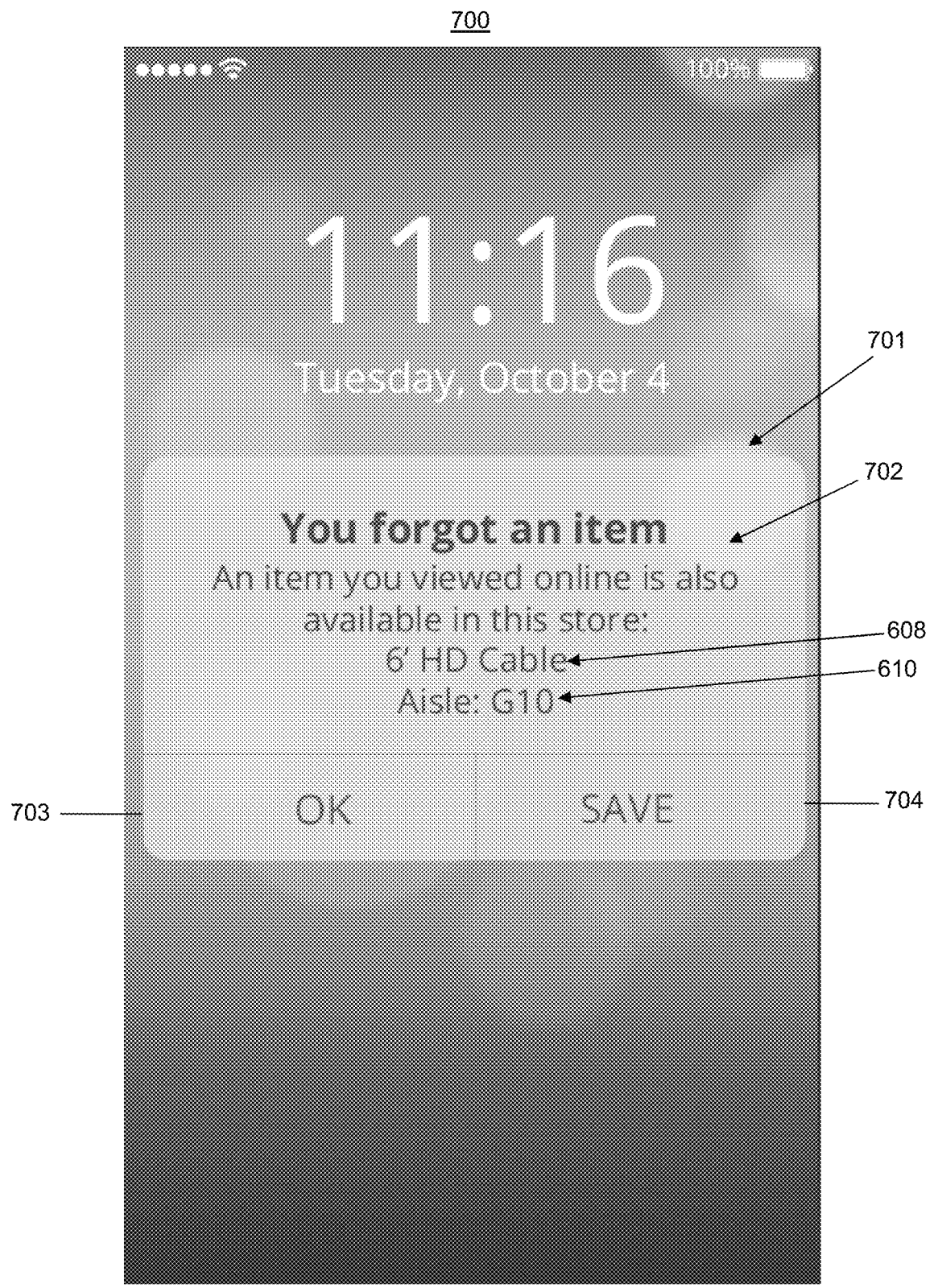

Turning now to FIG. 7, an exemplary embodiment of a GUI 700 is shown. In some embodiments, GUI 700 can comprise all or a part of elements displayed in GUI 600. In many embodiments, GUI 700 can comprise a notification 701. In various embodiments, notification 701 can be generated during or after blocks 404 (FIG. 4), 410 (FIG. 4), 503 (FIG. 5), 507 (FIG. 5), and/or 508 (FIG. 5). In the same or different embodiments, notification 701 can comprise notification description 702, a historical description 608, a historical item location indicator 610, a first selectable element 703, and/or a second selectable element 704. In various embodiments, a historical description 608 and/or a historical item location indicator 610 can be similar to and/or the same as described with referenced to GUI 600 (FIG. 6). In many embodiments, notification description 702 can comprise text and/or images describing a purpose of notification 701. In the embodiment depicted in GUI 700, notification description 702 is alerting a user of GUI 700 that they have forgotten an item that was sourced from a user history. In some embodiments, notification description 702 can alert a user of GUI 700 that they are within a physical proximity to an item sourced from a user history. In the same or different embodiments, first selectable element 703 can be configured to be selected by a user. In the same or different embodiments, after first selectable element 703 is selected by a user, notification 701 can be closed, dismissed, and/or minimized. In many embodiments, second selectable element 704 can be configured to be selected by a user. In various embodiments, after second selectable element 704 is selected by a user, notification 701 can be closed, dismissed, and/or minimized. In the same or different embodiments, after second selectable element 704 is selected by a user, a record described by historical description 608 can be added to and/or displayed on GUI 600 (FIG. 6).

Figure 8:
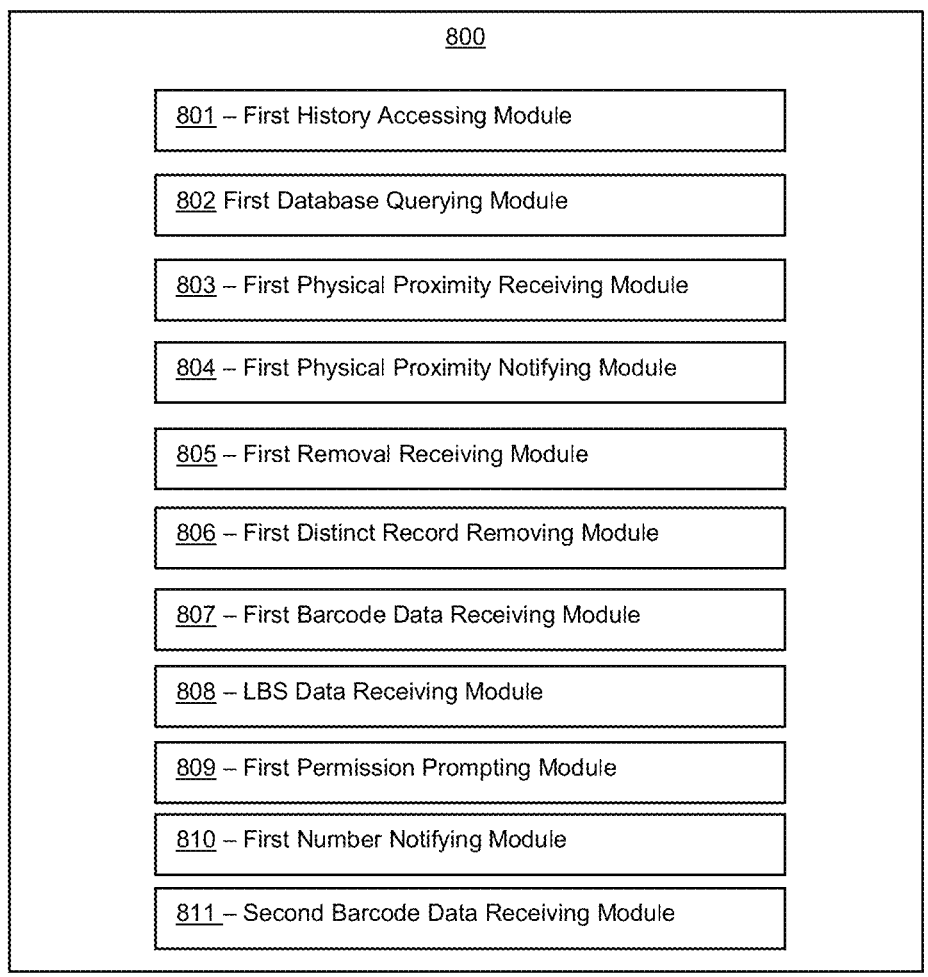
FIGS. 8-9 illustrate representative block diagrams of systems according to embodiments.

Turning now to FIG. 8, a block diagram of a system 800 that can be employed for managing a database. System 800 is merely exemplary and embodiments of the system are not limited to the embodiments presented herein. System 800 can be employed in many different embodiments or examples not specifically depicted or described herein. In some embodiments, certain elements or modules of system 800 can perform various procedures, processes, and/or activities. In these or other embodiments, the procedures, processes, and/or activities can be performed by other suitable elements or modules of system 800.

Generally, therefore, system 800 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 800 described herein.

In many embodiments, system 800 can comprise non-transitory memory storage module 801. Memory storage module 801 can be referred to as first history accessing module 801. In many embodiments, first history accessing module 801 can store computing instructions configured to run on one or more processing modules and perform one or more acts of method 400 (FIG. 4) (e.g., activity 401 (FIG. 4)).

In many embodiments, system 800 can comprise non-transitory memory storage module 802. Memory storage module 802 can be referred to as first database querying module 802. In many embodiments, first database querying module 802 can store computing instructions configured to run on one or more processing modules and perform one or more acts of method 400 (FIG. 4) (e.g., activity 402 (FIG. 4)).

In many embodiments, system 800 can comprise non-transitory memory storage module 803. Memory storage module 803 can be referred to as first physical proximity receiving module 803. In many embodiments, first physical proximity receiving module 803 can store computing instructions configured to run on one or more processing modules and perform one or more acts of method 400 (FIG. 4) (e.g., activity 403 (FIG. 4)).

In many embodiments, system 800 can comprise non-transitory memory storage module 804. Memory storage module 804 can be referred to as first proximity notifying module 804. In many embodiments, first proximity notifying module 804 can store computing instructions configured to run on one or more processing modules and perform one or more acts of method 400 (FIG. 4) (e.g., activity 404 (FIG. 4)).

In many embodiments, system 800 can comprise non-transitory memory storage module 805. Memory storage module 805 can be referred to as first removal receiving module 805. In many embodiments, first removal receiving module 805 can store computing instructions configured to run on one or more processing modules and perform one or more acts of method 400 (FIG. 4) (e.g., activity 405 (FIG. 4)).

In many embodiments, system 800 can comprise non-transitory memory storage module 806. Memory storage module 806 can be referred to as first distinct record removing module 806. In many embodiments, first distinct record removing module 806 can store computing instructions configured to run on one or more processing modules and perform one or more acts of method 400 (FIG. 4) (e.g., activity 406 (FIG. 4)).

In many embodiments, system 800 can comprise non-transitory memory storage module 807. Memory storage module 807 can be referred to as first barcode data receiving module 807. In many embodiments, first barcode data receiving module 807 can store computing instructions configured to run on one or more processing modules and perform one or more acts of method 400 (FIG. 4) (e.g., activity 407 (FIG. 4)).

In many embodiments, system 800 can comprise non-transitory memory storage module 808. Memory storage module 808 can be referred to as LBS data receiving module 808. In many embodiments, LBS data receiving module 808 can store computing instructions configured to run on one or more processing modules and perform one or more acts of method 400 (FIG. 4) (e.g., activity 408 (FIG. 4)).

In many embodiments, system 800 can comprise non-transitory memory storage module 809. Memory storage module 809 can be referred to as first permission prompting module 809. In many embodiments first permission prompting module 809 can store computing instructions configured to run on one or more processing modules and perform one or more acts of method 400 (FIG. 4) (e.g., activity 409 (FIG. 4)).

In many embodiments, system 800 can comprise non-transitory memory storage module 810. Memory storage module 810 can be referred to as first number notifying module 810. In many embodiments, first number notifying module 810 can store computing instructions configured to run on one or more processing modules and perform one or more acts of method 400 (FIG. 4) (e.g., activity 410 (FIG. 4)).

In many embodiments, system 800 can comprise non-transitory memory storage module 810. Memory storage module 811 can be referred to as second barcode data receiving module 811. In many embodiments, second barcode data receiving module 811 can store computing instructions configured to run on one or more processing modules and perform one or more acts of method 400 (FIG. 4) (e.g., activity 411 (FIG. 4)).

Figure 9:
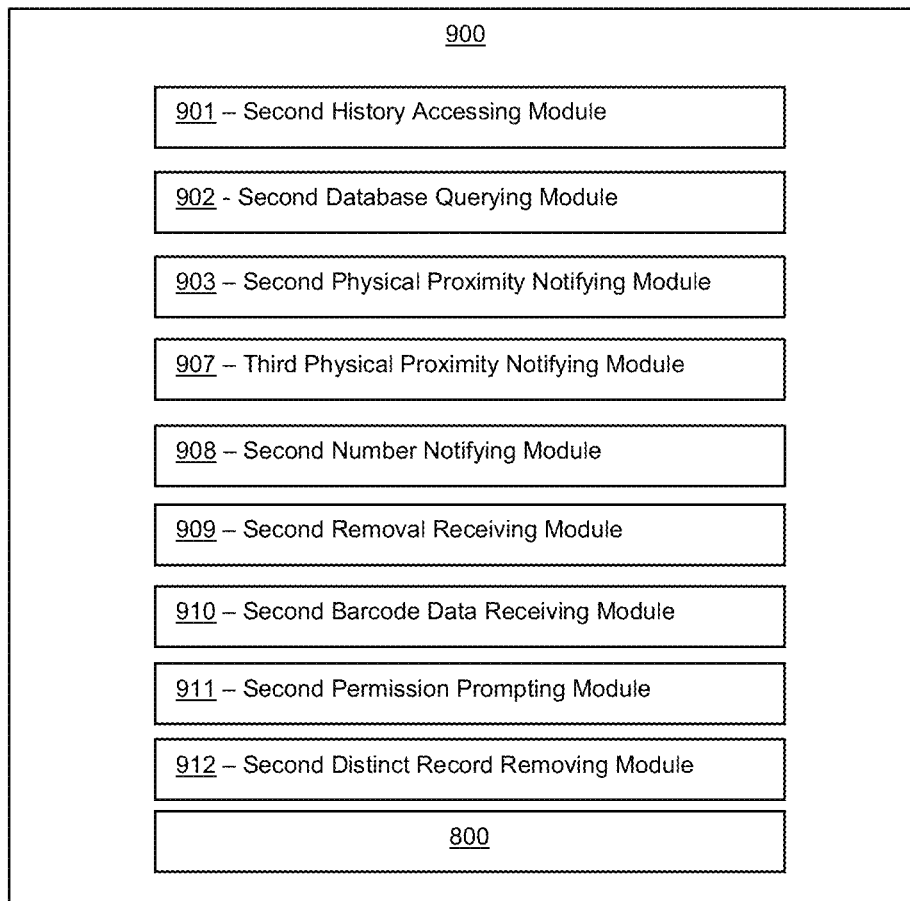

Turning now to FIG. 9, a block diagram of a system 900 that can be employed for managing a database. System 900 is merely exemplary and embodiments of the system are not limited to the embodiments presented herein. System 900 can be employed in many different embodiments or examples not specifically depicted or described herein. In some embodiments, certain elements or modules of system 900 can perform various procedures, processes, and/or activities. In these or other embodiments, the procedures, processes, and/or activities can be performed by other suitable elements or modules of system 900.

In many embodiments, system 900 can comprise a non-transitory storage medium comprising system 800. In some embodiments, a non-transitory storage medium comprising system 800 can store computing instructions configured to run on one or more processing modules and perform one or more acts of method 400 (FIG. 4).

In many embodiments, system 900 can comprise non-transitory memory storage module 901. Memory storage module 901 can be referred to as second history accessing module 901. In many embodiments, second history accessing module 901 can store computing instructions configured to run on one or more processing modules and perform one or more acts of method 500 (FIG. 5) (e.g., activity 501 (FIG. 5)).

In many embodiments, system 900 can comprise non-transitory memory storage module 902. Memory storage module 902 can be referred to as second database querying module 902. In many embodiments, second database querying module 902 can store computing instructions configured to run on one or more processing modules and perform one or more acts of method 500 (FIG. 5) (e.g., activity 502 (FIG. 5)).

In many embodiments, system 900 can comprise non-transitory memory storage module 903. Memory storage module 903 can be referred to as second physical proximity notifying module 903. In many embodiments, second physical proximity notifying module 903 can store computing instructions configured to run on one or more processing modules and perform one or more acts of method 500 (FIG. 5) (e.g., activity 503 (FIG. 5)).

In many embodiments, system 900 can comprise non-transitory memory storage module 907. Memory storage module 907 can be referred to as third physical proximity notifying module 907. In many embodiments, third physical proximity notifying module 907 can store computing instructions configured to run on one or more processing modules and perform one or more acts of method 500 (FIG. 5) (e.g., activity 507 (FIG. 5)).

In many embodiments, system 900 can comprise non-transitory memory storage module 908. Memory storage module 908 can be referred to as second number notifying module 908. In many embodiments, second number notifying module 908 can store computing instructions configured to run on one or more processing modules and perform one or more acts of method 500 (FIG. 5) (e.g., activity 508 (FIG. 5)).

In many embodiments, system 900 can comprise non-transitory memory storage module 909. Memory storage module 909 can be referred to as second removal receiving module 909. In many embodiments, second removal receiving module 909 can store computing instructions configured to run on one or more processing modules and perform one or more acts of method 500 (FIG. 5) (e.g., activity 509 (FIG. 5)).

In many embodiments, system 900 can comprise non-transitory memory storage module 910. Memory storage module 910 can be referred to as second barcode data receiving module 910. In many embodiments, second barcode data receiving module 910 can store computing instructions configured to run on one or more processing modules and perform one or more acts of method 500 (FIG. 5) (e.g., activity 510 (FIG. 5)).

In many embodiments, system 900 can comprise non-transitory memory storage module 911. Memory storage module 911 can be referred to as second permission prompting module 911. In many embodiments, second permission prompting module 911 can store computing instructions configured to run on one or more processing modules and perform one or more acts of method 500 (FIG. 5) (e.g., activity 511 (FIG. 5)).

In many embodiments, system 900 can comprise non-transitory memory storage module 912. Memory storage module 912 can be referred to as second distinct record removing module 912. In many embodiments, second distinct record removing module 912 can store computing instructions configured to run on one or more processing modules and perform one or more acts of method 500 (FIG. 5) (e.g., activity 512 (FIG. 5)).

Although the above embodiments have been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of or FIGS. 1-9 may be modified, and that the foregoing discussion of certain of these embodiments does not necessarily represent a complete description of all possible embodiments. For example, one or more of the procedures, processes, or activities of FIGS. 1-9 may include different procedures, processes, and/or activities and be performed by many different modules, in many different orders.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

We claim:

1. A system comprising:
   one or more processors;
   one or more non-transitory memory storage devices storing computing instructions configured to run on the one or more processors and perform:
   accessing a user history of a user in a user history database, wherein the user history comprises a historical set of records describing a historical set of physical items, wherein the historical set of records comprises a historical distinct record describing a historical distinct physical item, and wherein the historical set of physical items comprises the historical distinct physical item;
   querying a physical item database for a distinct location record, wherein the physical item database comprises the distinct location record, and wherein the distinct location record describes a location of the historical distinct physical item;

receiving a physical proximity indication that the user is within a predefined physical proximity to the location of the historical distinct physical item;

in response to receiving the physical proximity indication, automatically notifying the user that the user is within the predefined physical proximity to the location of the historical distinct physical item;

prompting the user for permission to remove the historical distinct record from the user history;

receiving a removal indication that the user has removed the historical distinct physical item from the location of the historical distinct physical item; and in response to receiving the removal indication, automatically removing the historical distinct record from the user history.

2. The system of claim 1, wherein:

the system further comprises:

a software application comprising a barcode scanner;

the physical item database further comprises a distinct record describing a location of a distinct physical item not of the historical set of physical items; and receiving the physical proximity indication that the user is within the predefined physical proximity to the location of the historical distinct physical item further comprises:

receiving data collected using the barcode scanner, wherein the data indicates that the user is within a distinct predefined physical proximity to the location of the distinct physical item.

3. The system of claim 1 wherein:

the system further comprises:

a software application comprising at least one of a GPS module, a WiFi module, a NFC module, or a RFID module; and receiving the physical proximity indication that the user is within the predefined physical proximity to the location of the historical distinct physical item further comprises:

receiving data collected from the GPS module, the WiFi module, the NFC module, or the RFID module.

4. The system of claim 3, wherein automatically notifying the user that the user is within the predefined physical proximity to the location of the historical distinct physical item occurs when the user enters a building containing the historical distinct physical item.

5. The system of claim 1, wherein the distinct location record comprises an aisle number describing an aisle and a section number describing a portion of a shelf, and wherein the aisle comprises the shelf in the aisle.

6. The system of claim 5, wherein automatically notifying the user that the user is within the predefined physical proximity to the location of the historical distinct physical item further comprises notifying the user of the aisle number and the section number.

7. The system of claim 1, wherein the user history is stored in the user history database as at least one of a cookie, a query string, or a session object.

8. The system of claim 1, wherein the historical set of records comprises an abandoned eCommerce shopping cart.

9. A system comprising:

one or more processors; and one or more non-transitory memory storage devices storing computing instructions configured to run on the one or more processors and perform:

accessing a user history of a user in a user history database, wherein the user history comprises a historical set of records describing a historical set of physical items, wherein the historical set of records comprises a historical distinct record describing a historical distinct physical item, and wherein the historical set of physical items comprises the historical distinct physical item;

querying a physical item database for a distinct location record, wherein the physical item database comprises the distinct location record, and wherein the distinct location record describes a location of the historical distinct physical item;

receiving a physical proximity indication that the user is within a predefined physical proximity to the location of the historical distinct physical item;

in response to receiving the physical proximity indication, automatically notifying the user that the user is within the predefined physical proximity to the location of the historical distinct physical item;

prompting the user for permission to remove the historical distinct record from the user history;

receiving a removal indication that the user has removed the historical distinct physical item from the location of the historical distinct physical item;

in response to receiving the removal indication, automatically removing the historical distinct record from the user history;

accessing the user history of the user in the user history database, wherein the historical set of records further comprises a distinct record describing a distinct physical item, and wherein the historical set of physical items comprises the distinct physical item;

querying a stock database, wherein the stock database comprises a distinct stock record describing whether the distinct physical item is actually present at a location of the distinct physical item;

notifying the user that the distinct physical item is not actually present at the location of the distinct physical item;

automatically notifying the user that the user is within a distinct predefined physical proximity to a location of a similar distinct physical item, wherein the similar distinct physical item is similar to the distinct physical item;

receiving a removal indication that the user has removed the similar distinct physical item from the location of the similar distinct physical item; and in response to receiving the removal indication, automatically removing the distinct record from the user history.

10. The system of claim 9 wherein the similar distinct physical item comprises the distinct physical item in a different size, quantity, or brand.

11. A method comprising:

accessing a user history of a user in a user history database, wherein the user history comprises a historical set of records describing a historical set of physical items, wherein the historical set of records comprises a historical distinct record describing a historical distinct physical item, and wherein the historical set of physical items comprises the historical distinct physical item;

querying a physical item database for a distinct location record, wherein the physical item database comprises the distinct location record, and wherein the distinct location record describes a location of the historical distinct physical item;

receiving a physical proximity indication that the user is within a predefined physical proximity to the location of the historical distinct physical item;

in response to receiving the physical proximity indication, automatically notifying the user that the user is within the predefined physical proximity to the location of the historical distinct physical item;

prompting the user for permission to remove the historical distinct record from the user history;

receiving a removal indication that the user has removed the historical distinct physical item from the location of the historical distinct physical item; and in response to receiving the removal indication, automatically removing the historical distinct record from the user history.

12. The method of claim 11 wherein:

the physical item database further comprises a distinct record describing a location of a distinct physical item not of the historical set of physical items; and receiving the physical proximity indication that the user is within the predefined physical proximity to the location of the historical distinct physical item further comprises:

receiving data collected using a barcode scanner, wherein the data indicates that the user is within a distinct predefined physical proximity to the location of the distinct physical item.

13. The method of claim 11, wherein receiving the physical proximity indication that the user is within the predefined physical proximity to the location of the historical distinct physical item further comprises:

receiving data collected from at least one of a GPS module, a WiFi module, a NFC module, a Bluetooth module, or a RFID module.

14. The method of claim 13, wherein automatically notifying the user that the user is within the predefined physical proximity to the location of the historical distinct physical item occurs when the user enters a building containing the historical distinct physical item.

15. The method of claim 11, wherein the distinct location record comprises an aisle number describing an aisle and a section number describing a portion of a shelf, and wherein the aisle comprises the shelf in the aisle.

16. The method of claim 15, wherein notifying the user that the user is within the predefined physical proximity to the location of the historical distinct physical item further comprises notifying the user of the aisle number and the section number.

17. The method of claim 11, wherein the user history is stored in the user history database as at least one of a cookie, a query string, or a session object.

18. The method of claim 11, wherein the historical set of records comprises an abandoned eCommerce shopping cart.

19. A method comprising:

accessing a user history of a user in a user history database, wherein the user history comprises a historical set of records describing a historical set of physical items, wherein the historical set of records comprises a historical distinct record describing a historical distinct physical item, and wherein the historical set of physical items comprises the historical distinct physical item;

querying a physical item database for a distinct location record, wherein the physical item database comprises the distinct location record, and wherein the distinct location record describes a location of the historical distinct physical item;

receiving a physical proximity indication that the user is within a predefined physical proximity to the location of the historical distinct physical item;

in response to receiving the physical proximity indication, automatically notifying the user that the user is within the predefined physical proximity to the location of the historical distinct physical item;

prompting the user for permission to remove the historical distinct record from the user history;

receiving a removal indication that the user has removed the historical distinct physical item from the location of the historical distinct physical item;

in response to receiving the removal indication, automatically removing the historical distinct record from the user history;

accessing the user history of the user in the user history database, wherein the historical set of records further comprises a distinct record describing a distinct physical item, and wherein the historical set of physical items comprises the distinct physical item;

querying a stock database, wherein the stock database comprises a distinct stock record describing whether the distinct physical item is actually present at a location of the distinct physical item;

notifying the user that the distinct physical item is not actually present at the location of the distinct physical item;

automatically notifying the user that the user is within a distinct predefined physical proximity to a location of a similar distinct physical item, wherein the similar distinct physical item is similar to the distinct physical item;

receiving a removal indication that the user has removed the similar distinct physical item from the location of the similar distinct physical item; and in response to receiving the removal indication, automatically removing the distinct record from the user history.

20. The method of claim 19 wherein the similar distinct physical item comprises the distinct physical item in a different size, quantity, or brand.

* * * * *